US012724695B2

(12) United States Patent
Silverstein et al.

(10) Patent No.: US 12,724,695 B2
(45) Date of Patent: Sep. 1, 2026

(54) DYNAMIC EXTRACTION OF TEST CASES BASED ON NATURAL LANGUAGE PROCESSING OF PEER-TO-PEER INTERACTIONS VIA TASK MINING MANAGEMENT

(71) Applicant: International Business Machines Corporation, Armonk, NY (US)

(72) Inventors: Zachary A. Silverstein, Georgetown, TX (US); Logan Bailey, Atlanta, GA (US); Suman Patra, Kolkata (IN); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/191,410

(22) Filed: Mar. 28, 2023

(65) Prior Publication Data

US 2024/0330156 A1 Oct. 3, 2024

(51) Int. Cl.
*G06F 11/3668* (2025.01)

(52) U.S. Cl.
CPC ................................ *G06F 11/3672* (2013.01)

(58) Field of Classification Search
None
See application file for complete search history.

(56) References Cited

U.S. PATENT DOCUMENTS 7,844,861 B2 11/2010 Hegarty
9,038,026 B2 5/2015 Chandra
10,705,943 B2 7/2020 Makkar
10,768,893 B2 9/2020 Misra
10,838,848 B2 11/2020 Fong
11,263,118 B2 3/2022 Bhadani
(Continued)

FOREIGN PATENT DOCUMENTS

CN 111581090 A 8/2020
CN 107832229 B 6/2021

OTHER PUBLICATIONS

"IBM Engineering Test Management", IBM, Printed Feb. 28, 2023, 9 pages, <https://www.ibm.com/products/ibm-engineering-test-management>.

(Continued)

*Primary Examiner* — Olabode Akintola
(74) *Attorney, Agent, or Firm* — Rakesh Roy

(57) ABSTRACT

In an approach for generating a test case from a conversational context between two or more users and storing the test case as a repeatable and deployable robotic process automation bot, a processor monitors an online communication between a first user and a second user using a natural language processing method. Responsive to determining the second user has provided an affirmative response to a request to test a system, a processor outputs a payload to the second user, wherein the payload contains one or more test cases. Subsequent to a N number of iterations of the second user and one or more additional users testing the system, a processor builds a Convolutional Neural Network model to predict when the first test case is successful. Responsive to finding a flag of success, a processor stores the first test case as a repeatable and deployable robotic process automation bot.

20 Claims, 3 Drawing Sheets

(56) References Cited

U.S. PATENT DOCUMENTS

| | | | | |
|---|---|---|---|---|
| 12,380,015 | B1 * | 8/2025 | Chandram | G06N 20/00 |
| 2016/0357519 | A1 | 12/2016 | Vargas | |
| 2018/0131645 | A1 * | 5/2018 | Magliozzi | G06F 40/30 |
| 2018/0285248 | A1 | 10/2018 | Gupta | |
| 2022/0156175 | A1 * | 5/2022 | Periyathambi | G06N 3/0464 |
| 2022/0292125 | A1 | 9/2022 | Mathur | |

OTHER PUBLICATIONS

"IBM Robotic Process Automation", IBM Corporation, Printed Feb. 28, 2023, 14 pages, <https://www.ibm.com/products/robotic-process automation>.

"Seven Reasons—When and why to choose IBM Engineering Lifecycle Management", IBM Corporation, 2022, 10 pages, <https://www.ibm.com/downloads/cas/GMRWEDXD>.

* cited by examiner

DYNAMIC EXTRACTION OF TEST CASES BASED ON NATURAL LANGUAGE PROCESSING OF PEER-TO-PEER INTERACTIONS VIA TASK MINING MANAGEMENT

BACKGROUND OF THE INVENTION

The present invention relates generally to the field of data processing, and more particularly to a dynamic extraction of test cases based on natural language processing (NLP) of peer-to-peer interactions via task mining management.

Software testing in software engineering ensures the quality of the system under development. This leads to end-user satisfaction and higher quality products in the future. Test cases can't be structured on static processes. Test cases appear ad-hoc based on individuals messaging each other versus having a structured test script file. Because of this, test cases only handle limited scenarios, and not the full scope of what may come up.

NLP refers to a branch of artificial intelligence (AI) concerned with giving computers the ability to understand written text and spoken words in much the same way human beings can. NLP combines computational linguistics-rule-based modeling of human language—with statistical, machine learning, and deep learning models. Together, these technologies enable computers to process human language in the form of text or voice data and to 'understand' its full meaning, complete with the speaker or writer's intent and sentiment.

SUMMARY

Aspects of an embodiment of the present invention disclose a method, computer program product, and computer system for generating a test case from a conversational context between two or more users and storing the test case as a repeatable and deployable robotic process automation bot. A processor monitors an online communication between a first user and a second user using a natural language processing method. Responsive to determining, using the natural language processing method, the second user has provided an affirmative response to a request from the first user to test a system, a processor outputs a payload from the first user to the second user, wherein the payload contains one or more test cases to be used to test the system. Responsive to the second user initiating testing the system using a first test case from the one or more test cases, a processor records the testing of the system using a task mining tool. Subsequent to an N number of iterations of the second user and one or more additional users testing the system, a processor builds a Convolutional Neural Network model to predict when the first test case is successful. Responsive to finding a flag of success to predict the first test case is successful, a processor stores the first test case as a repeatable and deployable robotic process automation bot.

In some aspects of an embodiment of the present invention, the natural language processing method is based on a degree of cosine similarity, and wherein the degree of cosine similarity is measured using a normalized weighted edge value.

In some aspects of an embodiment of the present invention, concurrent with monitoring the online communication between the first user and the second user using the natural language processing method, a processor outputs an alert notification, requesting the second user test the system. A processor receives a response to the request from the second user. A processor determines whether the response provided is the affirmative response.

In some aspects of an embodiment of the present invention, a processor processes the response using the natural language processing method. A processor calculates a degree of cosine similarity of the response. A processor determines the degree of cosine similarity of the response exceeds a pre-set threshold.

In some aspects of an embodiment of the present invention, the task mining tool uses Optical Character Recognition technology.

In some aspects of an embodiment of the present invention, concurrent with recording the testing of the system using the task mining tool, a processor enables the online communication between the first user and the second user to proceed. A processor monitors the online communication using the natural language processing method. A processor captures a positive response from the second user to the first test case. A processor adds the positive response from the second user to the first test case to an aggregate corpus.

In some aspects of an embodiment of the present invention, concurrent with recording the testing of the system using the task mining tool, a processor enables the online communication between the first user and the second user to proceed. A processor monitors the online communication using the natural language processing method. A processor captures a negative response from the second user to the first test case. A processor adds the negative response from the second user to the first test case to the aggregate corpus.

In some aspects of an embodiment of the present invention, subsequent to storing the first test case as the repeatable and deployable robotic process automation bot, a processor outputs the first test case to the second user and the one or more additional users testing the system to execute automatically.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that, in software engineering, software testing plays a crucial role. By ensuring quality of the system under development, software testing can lead to end-user satisfaction and higher quality products in the future. Often software tests cases can't be structured on static processes. They appear ad-hoc based-on individuals messaging each other (e.g., "User A, can you try the site and see if it works") versus having a structured test script file. Because of this, test cases only handle limited scenarios, and not the full scope of what may come up. Therefore, embodiments of the present invention recognize the need for a system and method to dynamically generate repeatable and deployable test cases.

Embodiments of the present invention provide a system and method to dynamically generate a test case from a conversational context (i.e., a peer-to-peer chat) between a first user on a development side of test case generation program 122 and a second user on a consumer side (i.e., an end user) using a natural language processing method. Embodiments of the present invention further provide a system and method to store the test case as a repeatable and deployable robotic process automation (RPA) bot to be automatically output to execute a future test case (i.e., instead of waiting for a manual intervention).

Implementation of embodiments of the present invention may take a variety of forms, and exemplary implementation details are discussed subsequently with reference to the Figures.

Figure 1:
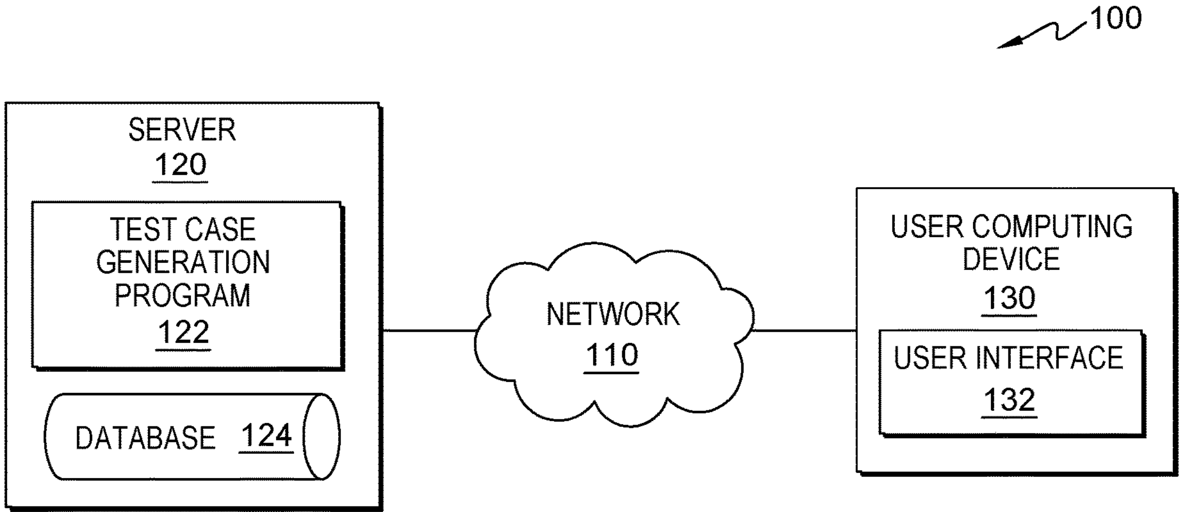
FIG. 1 is a functional block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120 and user computing device 130, and other computing devices (not shown) within distributed data processing environment 100.

Server 120 operates to run test case generation program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Test case generation program 122 operates to dynamically generate a test case from a conversational context (i.e., a peer-to-peer chat) between a first user on a development side of test case generation program 122 and a second user on a consumer side (i.e., an end user) using a natural language processing method. Test case generation program 122 operates to store the test case as a repeatable and deployable RPA bot to be automatically output to execute a future test case (i.e., instead of waiting for a manual intervention). In the depicted embodiment, test case generation program 122 is a standalone program. In another embodiment, test case generation program 122 may be integrated into another software product. In the depicted embodiment, test case generation program 122 resides on server 120. In another embodiment, test case generation program 122 may reside on another computing device (not shown), provided that test case generation program 122 has access to network 110. The operational steps of test case generation program 122 are depicted and described in further detail with respect to FIG. 2.

In an embodiment, the user of user computing device 130 registers with test case generation program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via test case generation program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by test case generation program 122. A database is an organized collection of data. Data includes, but is not limited to, information about user preferences (e.g., general user system settings such as alert notifications for user computing device 130); information about alert notification preferences; one or more responses of a user; first set of one or more factors; second set of one or more factors; and any other data received, used, and/or generated by test case generation program 122.

Database 124 can be implemented with any type of device capable of storing data and configuration files that can be accessed and utilized by server 120, such as a hard disk drive, a database server, or a flash memory. In an embodiment, database 124 is accessed by test case generation program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that test case generation program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Test case generation program 122 enables the authorized and secure processing of personal data and/or confidential company data.

Test case generation program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Test case generation program 122 provides information regarding personal and/or confidential company data and the nature (e.g., type, scope, purpose, duration, etc.) of the processing. Test case generation program 122 provides the user with copies of stored personal and/or confidential company data. Test case generation program 122 allows the correction or completion of incorrect or incomplete personal and/or confidential company data. Test case generation program 122 allows for the immediate deletion of personal and/or confidential company data.

User computing device 130 operates to run user interface 132 through which a user can interact with test case generation program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with test case generation program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between test case generation program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from test case generation program 122 to a user via network 110. User interface 132 can also display or present alerts including information (such as graphics, text, and/or sound) sent from test case generation program 122 to a user via network 110. In an embodiment, user interface 132 can send and receive data (i.e., to and from test case generation program 122 via network 110, respectively). Through user interface 132, a user can opt-in to test case generation program 122; input information about the user; create a user profile; set user preferences and alert notification preferences; receive an alert notification, initiate an interaction with a user; respond to a request to test a system; receive a payload; test the system; respond with results of the test; receive a request for feedback; and input feedback.

A user preference is a setting that can be customized for a particular user. A set of default user preferences are assigned to each user of test case generation program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of test case generation program 122.

Figure 2:
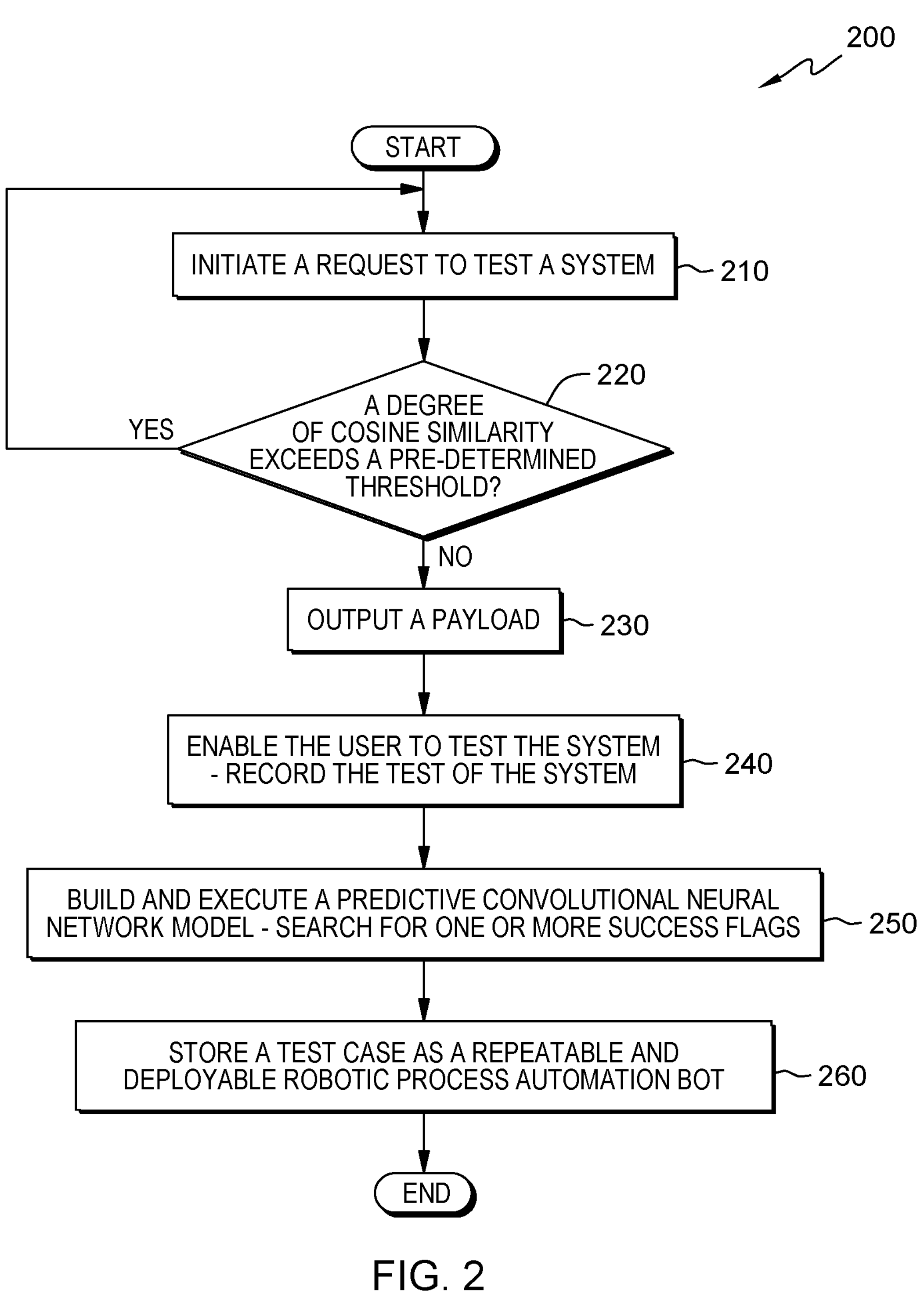
FIG. 2 is a flowchart illustrating the operational steps of a test case generation program, on a server within the distributed data processing environment of FIG. 1, in accordance with an embodiment of the present invention.

FIG. 2 is a flowchart, generally designated 200, illustrating the operational steps for test case generation program 122, on server 120 within distributed data processing environment 100 of FIG. 1, in accordance with an embodiment of the present invention. In an embodiment, test case generation program 122 operates to dynamically generate a test case from a conversational context (i.e., a peer-to-peer chat) between a first user on a development side of test case generation program 122 and a second user on a consumer side (i.e., an end user) using a natural language processing method. In an embodiment, test case generation program 122 operates to store the test case as a repeatable and deployable RPA bot to be automatically output to execute a future test case (i.e., instead of waiting for a manual intervention). It should be appreciated that the process depicted in FIG. 2 illustrates one possible iteration of the process flow, which may be repeated for each interaction initiated with the first user.

Prior to step 210, test case generation program 122 is integrated into a communication platform. The communication platform is a software solution that facilitates internal and external messaging. The communication platform utilizes a plurality of channels, including, but not limited to, phone, video conferencing, team messaging, task management, project management, file sharing, and customer communication functionality. The communication platform may be, but is not limited to, internal communications (i.e., voice over internet protocol, instant messaging (e.g., e-mail messengers, social media messengers, video messengers, and freeware and cross-platform messengers), video conferencing, collaboration tools, project management (e.g., an issue and project tracking tool and a productivity application), and customer communications (e.g., customer interactions, support tickets, and live chats).

In step 210, test case generation program 122 outputs an alert notification to a user. In an embodiment, test case generation program 122 outputs an alert notification to a user via a user interface (e.g., user interface 132) of a user computing device (e.g., user computing device 130). In an embodiment, test case generation program 122 outputs an alert notification to a user to initiate an interaction with the user (e.g., a peer-to-peer chat between a first user on a development side of test case generation program 122 and a second user on a consumer side (i.e., an end user) of test case generation program 122). In an embodiment, test case generation program 122 monitors the interaction with the user. In an embodiment, test case generation program 122 monitors the interaction with the user using a Natural Language Processing (NLP) method. In an embodiment, test case generation program 122 monitors the interaction with the user continually throughout the iteration of the process flow. In an embodiment, test case generation program 122 outputs an alert notification to a user, requesting the user test a system. In an embodiment, responsive to receiving the request, test case generation program 122 enables the user to respond to the request. In an embodiment, test case generation program 122 enables the user to respond to the request via the user interface (e.g., user interface 132) of the user computing device (e.g., user computing device 130).

In decision step 220, test case generation program 122 determines whether an affirmative response to the request was provided by the user. In an embodiment, test case generation program 122 receives a response to the request from the user. In an embodiment, test case generation program 122 processes the response to the request. In an embodiment, test case generation program 122 processes the response to the request to determine whether an affirmative response to the request was provided by the user. In an embodiment, test case generation program 122 processes the response to the request using a NLP method. The NLP method is based on a degree of cosine similarity. The degree of cosine similarity is measured using a normalized weighted edge value. In an embodiment, test case generation program 122 calculates a degree of cosine similarity of the response to the request. In an embodiment, test case generation program 122 weights the response to the request equal to the measured degree of cosine similarity. In an embodiment, test case generation program 122 processes the response to the request to determine whether a time when the user would test the system (e.g., "I will test the system right now.") was indicated by the user. In an embodiment, if test case generation program 122 determines the user's response is in the affirmative and includes a time indicator (e.g., "I will test the system right now."), then test case generation program 122 applies a higher weight to the user's response (i.e., an additional amount of weight to the normalized weighted edge value measured). In an embodiment, test case generation program 122 determines whether the degree of cosine similarity exceeds a pre-set threshold. The pre-set threshold is a numerical value set by test case generation program 122 before the alert notification is sent to the user (i.e., step 210). If test case generation program 122 determines the degree of cosine similarity exceeds the pre-set threshold (i.e., a negative response to the request from the user) (decision step 220, YES branch), then test case generation program 122 returns to step 210 and waits a pre-set period of time before requesting the user test the system again. A negative response from the user may include, but is not limited to, "no", "I cannot", "I will not", "I do not", and any other negative response to the request. If test case generation program 122 determines the degree of cosine similarity does not exceed the pre-set threshold (i.e., an affirmative response to the request from the user) (decision step 220, NO branch), then test case generation program 122 proceeds to step 230, sending the user a payload. An affirmative response from the user may include, but is not limited to, "yes", "definitely", "certainly", "I can", "I will", and any other affirmative response to the request. In continuation of the example above, test case generation program 122 processes the user's response (i.e., "Yes, I will test the system.") using NLP. Test case generation program 122 measures the degree of cosine similarity. Test case generation program 122 determines the degree of cosine similarity does not exceed a pre-set threshold. Test case generation program 122 determines the user's response is in the affirmative.

In step 230, responsive to determining an affirmative response to the request was provided by the user, test case generation program 122 outputs a payload to the user. In an embodiment, test case generation program 122 outputs a payload to the user via the user computing device (e.g., user computing device 130). The payload is the "actual data" transmitted in a packet or file minus all headers attached for transport and minus all descriptive metadata. In a network packet, headers are appended to the payload for transport and then discarded at their destruction. The payload contains one or more test cases to be used to test the system. In an embodiment, test case generation program 122 outputs a payload to the user to begin processing and monitoring one or more log files contained in the payload.

In step 240, test case generation program 122 enables the user to test the system. In an embodiment, test case generation program 122 enables the user to test the system using a test case from the payload. In an embodiment, test case generation program 122 enables the user to test the system via the user interface (e.g., user interface 132) of the user computing device (e.g., user computing device 130). In an embodiment, responsive to the user initiating testing of the system using a test case from the payload, test case generation program 122 records the testing of the system. In an embodiment, test case generation program 122 records the testing of the system using a task mining tool. The task mining tool utilizes Optical Character Recognition (OCR) technology. OCR technology is also referred to as text recognition. OCR technology extracts and repurposes data from scanned documents, camera images and image-only pdfs. OCR technology singles out letters on the image, puts them into words, and then puts the words into sentences, thus enabling access to and editing of the original content. OCR technology also eliminates the need for manual data entry. OCR technology uses a combination of hardware and software to convert physical, printed documents into machine-readable text. Hardware-such as an optical scanner or specialized circuit board-copies or reads text; then, software typically handles the advanced processing. In another embodiment, test case generation program 122 records the testing of the system using a reduction to practice method. The reduction to practice method is a client-side component that is embedded in a user computing device (e.g., user computing device 130) to observe the actions (e.g., tasks and/or components of tasks) and interactions of the user to determine whether the system works for its intended purpose.

In an embodiment, from the recording, test case generation program 122 captures data, wherein the data includes a first set of one or more factors. The first set of one or more factors may include, but is not limited to, a compatibility of a user interface, one or more log file changes of active applications, and a web browser network traffic. From the first set of one or more factors, test case generation program 122 may determine whether the system is compatible with a user interface standard (i.e., from a test of a user interface (e.g., user interface 132)) and whether the system reflects a business function and/or a business requirement (i.e., from a test of the system (e.g., through an application)). The first set of one or more factors may provide, but are not limited to, a check of one or more environments (e.g., one or more browsers) and/or one or more user categories, one or more links, one or more forms, one or more client/server scripting, one or more dynamic HTMLs, and one or more pop-up windows. In an embodiment, test case generation program 122 records the testing of the system to understand a context of the data captured. In an embodiment, test case generation program 122 stores the first set of one or more factors in a dictionary type object (i.e., in an aggregate corpus (e.g., database 124)). In an embodiment, test case generation program 122 stores the first set of one or more factors in a dictionary type object so that the first set of one or more factors may be validated.

In an embodiment, concurrent with the recording of the testing of the system, test case generation program 122 enables the user to continue the interaction with test case generation program 122 (i.e., started in step 210). In an embodiment, test case generation program 122 enables the user to document the user's reactions to the actions (e.g., tasks and/or components of tasks) and interactions with the user. In an embodiment, test case generation program 122 enables the user to document the user's reactions to the actions and interactions with the user while the user tests the system and/or after the user tests the system. In an embodiment, test case generation program 122 enables the user to document the user's reactions to the actions and interactions with the user via the user interface (e.g., user interface 132) of the user computing device (e.g., user computing device 130). In an embodiment, test case generation program 122 captures one or more responses (i.e., affirmative responses and/or negative responses (e.g., "It looks good to me." or "There is an issue.")) from the user. In an embodiment, test case generation program 122 stores the one or more responses in the dictionary type object (i.e., in an aggregate corpus (e.g., database 124)). In an embodiment, test case generation program 122 stores the one or more responses so that the one or more responses may be validated. In an embodiment, test case generation program 122 considers a length of time that has elapsed since the alert notification was sent to the user (i.e., step 210).

In step 250, subsequent to N number of iterations of the user and one or more other users testing the system, test case generation program 122 builds a Convolutional Neural Network (CNN) model. In an embodiment, test case generation program 122 builds a CNN model to predict when the test case used to test the system is successful. In another embodiment, test case generation program 122 builds a predictive recurrent neural network (RNN) model. N is a numerical value pre-set by test case generation program 122. In an embodiment, test case generation program 122 executes the CNN model. In an embodiment, test case generation program 122 executes the CNN model to extract a second set of one or more factors. In an embodiment, test case generation program 122 executes the CNN model to extract a second set of one or more factors from the interaction with the user (i.e., the peer-to-peer chat between the first user on the development side of test case generation program 122 and the second user on the consumer side (i.e., the end user)). The second set of one or more factors may include, but is not limited to, an indicator field, a page, and a value. In an embodiment, test case generation program 122 parameterizes the actions taken by the user. In an embodiment, test case generation program 122 generates a reusable script and/or unit test. In an embodiment, after N number of iterations, using a CNN model, test case generation program 122 predicts what a success looks like (e.g., the text box appearing on the second webpage and/or user A responding, "Yes, the website looks good.") and what a failure looks like (e.g., the text box not appearing on the second webpage, a webpage appearing with red text, and/or user A responding, "No, I am getting a few error messages."). In an embodiment, test case generation program 122 searches for a success flag. In an embodiment, test case generation program 122 searches for a success flag in the interaction with the user (e.g., a chat and/or a conversation between a development user and an end user of test case generation program 122). A success flag may start with a statement, such as "I will try.", and end with a statement, such as "That fixed it.". In an embodiment, test case generation program 122 stores the second set of one or more factors in the dictionary type object (i.e., in an aggregate corpus (e.g., database 124)).

In step 260, responsive to finding a flag of success, test case generation program 122 stores the test case as a repeatable and deployable RPA bot. In an embodiment, after the test case is stored as a repeatable and deployable RPA bot, test case generation program 122 may output the test case to be executed automatically (i.e., instead of waiting for a manual intervention). In an embodiment, test case generation program 122 may output the test case to the user via the RPA bot. In another embodiment, test case generation program 122 may output the test case to the user via another automation manner.

For example, test case generation program 122 outputs an alert notification to user computing device 130 of user A initiating an interaction with user A. The alert notification requests, "Can you test a recently created website?" User A responds to the request, stating, "Yes, I will test the system." Test case generation program 122 processes user A's response using NLP. Responsive to determining an affirmative response was provided by user A, test case generation program 122 sends user A a payload. User A opens a link to a website provided in the payload and tests the website. While user A tests the website, test case generation program 122 records the test of the website. Specifically, test case generation program 122 records the actions taken by user A (i.e., opening a first webpage using the link provided in the payload, clicking on a dropdown box on the first webpage, selecting an option in the dropdown box, opening a second webpage, inputting a value in a text box on the second webpage, and selecting "ok"). Test case generation program 122 parameterizes the actions taken by user A and generates a reusable script and/or unit test. After N number of iterations, using a Convolutional Neural Network, test case generation program 122 predicts what a success looks like (e.g., the text box appearing on the second webpage and/or user A responding, "Yes, the website looks good.") and what a failure looks like (e.g., the text box not appearing on the second webpage, a webpage appearing with red text, and/or user A responding, "No, I am getting a few error messages."). Test case generation program 122 extracts the test case and stores the test case as a repeatable and deployable RPA bot to be output to the user to execute automatically.

Figure 3:
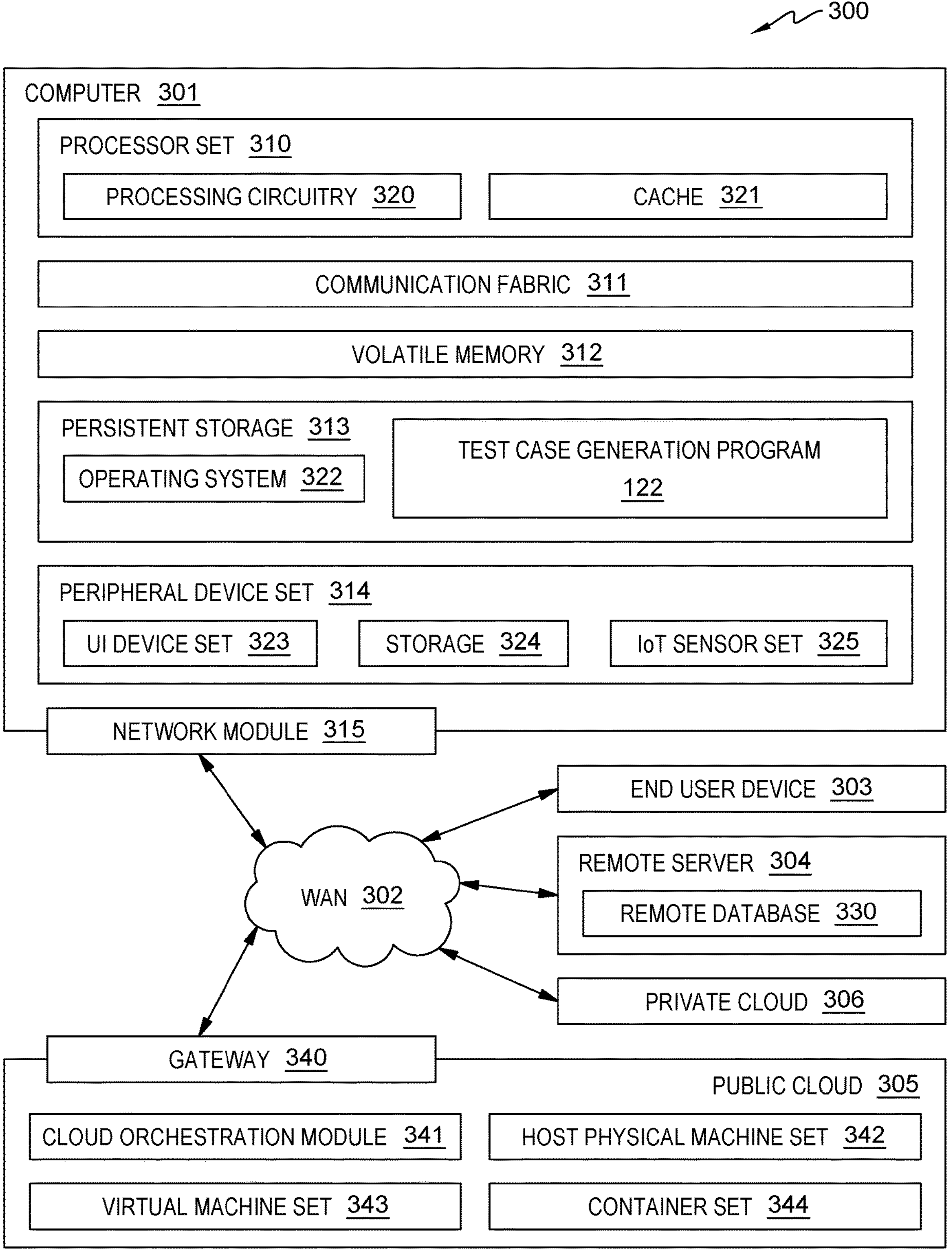
FIG. 3 depicts a block diagram of components of a computing environment representing the distributed data processing environment of FIG. 1, in accordance with an embodiment of the present invention.

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as test case generation program 122. In addition to test case generation program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and test case generation program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in test case generation program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in test case generation program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

monitoring, by one or more processors, an online communication between a first user and a second user using a natural language processing method;

responsive to determining, using the natural language processing method, the second user has provided an affirmative response to a request from the first user to test a system, outputting, by the one or more processors, a payload from the first user to the second user, wherein the payload contains one or more test cases to be used to test the system;

responsive to the second user initiating testing the system using a first test case from the one or more test cases, recording, by the one or more processors, the testing of the system using a task mining tool;

subsequent to an N number of iterations of the second user and one or more additional users testing the system, building, by the one or more processors, a Convolutional Neural Network model to predict when the first test case is successful; and responsive to finding a flag of success to predict the first test case is successful, storing, by the one or more processors, the first test case as a repeatable and deployable robotic process automation bot.

2. The computer-implemented method of claim 1, wherein the natural language processing method is based on a degree of cosine similarity, and wherein the degree of cosine similarity is measured using a normalized weighted edge value.

3. The computer-implemented method of claim 1, further comprising:

concurrent with monitoring the online communication between the first user and the second user using the natural language processing method, outputting, by the one or more processors, an alert notification, requesting the second user test the system;

receiving, by the one or more processors, a response to the request from the second user; and determining, by the one or more processors, whether the response provided is the affirmative response.

4. The computer-implemented method of claim 1, wherein determining whether the response provided is the affirmative response further comprises:

processing, by the one or more processors, the response using the natural language processing method;

calculating, by the one or more processors, a degree of cosine similarity of the response; and determining, by the one or more processors, the degree of cosine similarity of the response exceeds a pre-set threshold.

5. The computer-implemented method of claim 1, wherein the task mining tool uses Optical Character Recognition technology.

6. The computer-implemented method of claim 1, further comprising:

concurrent with recording the testing of the system using the task mining tool, enabling, by the one or more processors, the online communication between the first user and the second user to proceed;

monitoring, by the one or more processors, the online communication using the natural language processing method;

capturing, by the one or more processors, a positive response from the second user to the first test case; and adding, by the one or more processors, the positive response from the second user to the first test case to an aggregate corpus.

7. The computer-implemented method of claim 1, further comprising:

concurrent with recording the testing of the system using the task mining tool, enabling, by the one or more processors, the online communication between the first user and the second user to proceed;

monitoring, by the one or more processors, the online communication using the natural language processing method;

capturing, by the one or more processors, a negative response from the second user to the first test case; and adding, by the one or more processors, the negative response from the second user to the first test case to the aggregate corpus.

8. The computer-implemented method of claim 1, further comprising:

subsequent to storing the first test case as the repeatable and deployable robotic process automation bot, outputting, by the one or more processors, the first test case to the second user and the one or more additional users testing the system to execute automatically.

9. A computer program product comprising:

one or more computer readable storage media and program instructions stored on the one or more computer readable storage media, the program instructions comprising:

program instructions to monitor an online communication between a first user and a second user using a natural language processing method;

responsive to determining, using the natural language processing method, the second user has provided an affirmative response to a request from the first user to test a system, program instructions to output a payload from the first user to the second user, wherein the payload contains one or more test cases to be used to test the system;

responsive to the second user initiating testing the system using a first test case from the one or more test cases, program instructions to record the testing of the system using a task mining tool;

subsequent to an N number of iterations of the second user and one or more additional users testing the system, program instructions to build a Convolutional Neural Network model to predict when the first test case is successful; and responsive to finding a flag of success to predict the first test case is successful, program instructions to store the first test case as a repeatable and deployable robotic process automation bot.

10. The computer program product of claim 9, wherein the natural language processing method is based on a degree of cosine similarity, and wherein the degree of cosine similarity is measured using a normalized weighted edge value.

11. The computer program product of claim 9, further comprising:

concurrent with monitoring the online communication between the first user and the second user using the natural language processing method, program instructions to output an alert notification, requesting the second user test the system;

program instructions to receive a response to the request from the second user; and program instructions to determine whether the response provided is the affirmative response.

12. The computer program product of claim 9, wherein determining whether the response provided is the affirmative response further comprises:

program instructions to process the response using the natural language processing method;

program instructions to calculate a degree of cosine similarity of the response; and program instructions to determine the degree of cosine similarity of the response exceeds a pre-set threshold.

13. The computer program product of claim 9, further comprising:

concurrent with recording the testing of the system using the task mining tool, program instructions to enable the online communication between the first user and the second user to proceed;

program instructions to monitor the online communication using the natural language processing method;

program instructions to capture a positive response from the second user to the first test case; and program instructions to add the positive response from the second user to the first test case to an aggregate corpus.

14. The computer program product of claim 9, further comprising:

concurrent with recording the testing of the system using the task mining tool, program instructions to enable the online communication between the first user and the second user to proceed;

program instructions to monitor the online communication using the natural language processing method;

program instructions to capture a negative response from the second user to the first test case; and program instructions to add the negative response from the second user to the first test case to the aggregate corpus.

15. A computer system comprising:

one or more computer processors;

one or more computer readable storage media;

program instructions collectively stored on the one or more computer readable storage media for execution by at least one of the one or more computer processors, the stored program instructions comprising:

program instructions to monitor an online communication between a first user and a second user using a natural language processing method;

responsive to determining, using the natural language processing method, the second user has provided an affirmative response to a request from the first user to test a system, program instructions to output a payload from the first user to the second user, wherein the payload contains one or more test cases to be used to test the system;

responsive to the second user initiating testing the system using a first test case from the one or more test cases, program instructions to record the testing of the system using a task mining tool;

subsequent to an N number of iterations of the second user and one or more additional users testing the system, program instructions to build a Convolutional Neural Network model to predict when the first test case is successful; and responsive to finding a flag of success to predict the first test case is successful, program instructions to store the first test case as a repeatable and deployable robotic process automation bot.

16. The computer system of claim 15, wherein the natural language processing method is based on a degree of cosine similarity, and wherein the degree of cosine similarity is measured using a normalized weighted edge value.

17. The computer system of claim 15, further comprising:

concurrent with monitoring the online communication between the first user and the second user using the natural language processing method, program instructions to output an alert notification, requesting the second user test the system;

program instructions to receive a response to the request from the second user; and program instructions to determine whether the response provided is the affirmative response.

18. The computer system of claim 15, wherein determining whether the response provided is the affirmative response further comprises:

program instructions to process the response using the natural language processing method;

program instructions to calculate a degree of cosine similarity of the response; and program instructions to determine the degree of cosine similarity of the response exceeds a pre-set threshold.

19. The computer system of claim 15, further comprising:

concurrent with recording the testing of the system using the task mining tool, program instructions to enable the online communication between the first user and the second user to proceed;

program instructions to monitor the online communication using the natural language processing method;

program instructions to capture a positive response from the second user to the first test case; and program instructions to add the positive response from the second user to the first test case to an aggregate corpus.

20. The computer system of claim 15, further comprising:

concurrent with recording the testing of the system using the task mining tool, program instructions to enable the online communication between the first user and the second user to proceed;

program instructions to monitor the online communication using the natural language processing method;

program instructions to capture a negative response from the second user to the first test case; and program instructions to add the negative response from the second user to the first test case to the aggregate corpus.

* * * * *